United States Patent
McBride et al.

(10) Patent No.: US 10,880,523 B2
(45) Date of Patent: Dec. 29, 2020

(54) METHOD OF MONITORING VIDEO

(71) Applicant: EDESIX LIMITED

(72) Inventors: Richard McBride, Fife (GB); Robin Anthony Iddon, Edinburgh (GB)

(73) Assignee: EDESIX LIMITED, Glasgow (GB)

( * ) Notice: Subject to any disclaimer, the term of this patent is extended or adjusted under 35 U.S.C. 154(b) by 0 days.

(21) Appl. No.: 16/197,922

(22) Filed: Nov. 21, 2018

(65) Prior Publication Data

US 2019/0158788 A1    May 23, 2019

(30) Foreign Application Priority Data

Nov. 21, 2017    (GB) .................................. 1719340.0

(51) Int. Cl.
| | |
|---|---|
| *H04N 7/18* | (2006.01) |
| *H04W 52/02* | (2009.01) |
| *H04L 29/08* | (2006.01) |
| *H04L 29/12* | (2006.01) |
| *H04L 12/851* | (2013.01) |
| *H04B 1/3827* | (2015.01) |

(Continued)

(52) U.S. Cl.
CPC ......... *H04N 7/181* (2013.01); *H04L 61/2038* (2013.01); *H04L 67/22* (2013.01); *H04L 67/322* (2013.01); *H04L 67/36* (2013.01); *H04W 52/0251* (2013.01); *H04B 1/385* (2013.01); *H04L 47/2416* (2013.01); *H04L 47/2433* (2013.01); *H04L 61/6022* (2013.01); *H04N 21/2187* (2013.01)

(58) Field of Classification Search
None
See application file for complete search history.

(56) References Cited

U.S. PATENT DOCUMENTS

| | | | |
|---|---|---|---|
| 9,047,698 B2 * | 6/2015 | Maciocci | ................ G06F 3/167 |
| 9,142,062 B2 * | 9/2015 | Maciocci | .............. G06T 15/503 |
| 9,384,594 B2 * | 7/2016 | Maciocci | ............ H04N 9/3173 |

(Continued)

FOREIGN PATENT DOCUMENTS

| | | |
|---|---|---|
| KR | 101722664 B1 | 4/2017 |
| WO | 2014144601 A1 | 9/2014 |

OTHER PUBLICATIONS

GB Search Report, GB Application No. 1719340.0, dated May 22, 2018.

(Continued)

*Primary Examiner* — Reza Aghevli

(57) ABSTRACT

The invention relates to a method of monitoring video from a plurality of body mounted video capturing devices, the method comprising: receiving video data from a first body mounted video capturing device of the said plurality; propagating video data received from the said first body mounted video capturing device, or video data derived therefrom, to a closed circuit television (CCTV) monitoring system by way of an input channel thereof; subsequently receiving video data from a second body mounted video capturing device of the said plurality different from the said first body mounted video capturing device; and propagating video data received from the said second body mounted video capturing device, or video data derived therefrom, to the said CCTV monitoring system by way of the same said input channel thereof.

8 Claims, 7 Drawing Sheets

(51) Int. Cl.
*H04N 21/2187* (2011.01)
*H04L 12/853* (2013.01)

(56) References Cited

U.S. PATENT DOCUMENTS

| | | | | |
|---|---|---|---|---|
| 2004/0001149 | A1* | 1/2004 | Smith | G08B 13/19643 |
| | | | | 348/218.1 |
| 2012/0249416 | A1* | 10/2012 | Maciocci | G06T 17/05 |
| | | | | 345/156 |
| 2012/0249544 | A1* | 10/2012 | Maciocci | G06F 3/0425 |
| | | | | 345/419 |
| 2012/0249590 | A1* | 10/2012 | Maciocci | G06T 15/503 |
| | | | | 345/633 |
| 2012/0249591 | A1* | 10/2012 | Maciocci | G06T 19/006 |
| | | | | 345/633 |
| 2012/0249741 | A1* | 10/2012 | Maciocci | G06T 15/503 |
| | | | | 348/46 |
| 2013/0271602 | A1* | 10/2013 | Bentley | G06K 9/00342 |
| | | | | 348/143 |
| 2014/0376876 | A1* | 12/2014 | Bentley | G06K 9/00744 |
| | | | | 386/227 |
| 2015/0154452 | A1* | 6/2015 | Bentley | G11B 27/031 |
| | | | | 386/201 |
| 2015/0317801 | A1* | 11/2015 | Bentley | G08B 21/043 |
| | | | | 382/107 |
| 2015/0318015 | A1* | 11/2015 | Bose | A63F 13/212 |
| | | | | 386/248 |
| 2015/0324636 | A1* | 11/2015 | Bentley | A63F 13/00 |
| | | | | 386/227 |
| 2015/0348591 | A1* | 12/2015 | Kaps | G11B 27/031 |
| | | | | 386/201 |
| 2016/0191862 | A1* | 6/2016 | Yokomitsu | H04N 5/232 |
| | | | | 348/158 |
| 2016/0227173 | A1* | 8/2016 | Yamaguchi | H04N 9/8205 |
| 2016/0292509 | A1* | 10/2016 | Kaps | A63F 13/00 |
| 2016/0292881 | A1* | 10/2016 | Bose | G06K 9/00711 |
| 2016/0322078 | A1* | 11/2016 | Bose | A63F 13/217 |
| 2017/0111565 | A1* | 4/2017 | Shibahara | H04N 5/04 |
| 2017/0208107 | A1* | 7/2017 | McLennan | H04L 65/4069 |
| 2017/0258325 | A1* | 9/2017 | Carrick | A61B 3/145 |
| 2017/0262154 | A1* | 9/2017 | Black | G02B 27/0093 |
| 2017/0262697 | A1* | 9/2017 | Kaps | G11B 27/022 |
| 2017/0331952 | A1* | 11/2017 | Rogers | H04N 7/147 |
| 2018/0048750 | A1* | 2/2018 | Hardi | B62D 1/04 |
| 2018/0063421 | A1* | 3/2018 | Yokomitsu | H04N 5/77 |

OTHER PUBLICATIONS

Genetec—Zepcam: "P Zepcam Live", Streaming Body-Worn Camera, Dec. 31, 2015 (Dec. 31, 2015), XP055573050, Retrieved from the Internet: URL:https://www.genetec.com/Documents/EN/T.
European Search Report, corresponding patent application No. 18207395.7, dated Jul. 8, 2019, all pages.

* cited by examiner

| User | Device | Time |
|---|---|---|
| User 1 | Device 1 | 1/1/2017; 9am-4pm |
| User 2 | Device 2 | 1/1/2017; 9.20am-4.30pm |
| User 3 | Device 3 | 1/1/2017; 9.30am-4.20pm |

| User | Device | Time |
|---|---|---|
| User 1 | Device 2 | 2/1/2017; 9.10am-4pm |
| User 2 | Device 3 | 2/1/2017; 9.am-4.30pm |
| User 3 | Device 1 | 2/1/2017; 10am-5pm |

METHOD OF MONITORING VIDEO

FIELD OF THE INVENTION

The invention relates to: methods of monitoring video from a plurality of body mounted video capturing devices; video servers; a video monitoring system; and a method of monitoring a battery charge status of a body mountable video capturing device.

BACKGROUND TO THE INVENTION

In many businesses, for example, in retail, hospitality and social services, employees are required to interact with the public in the course of their duties. In extreme circumstances encounters with the public can become hostile and the employee can feel threatened. In such circumstances it can be beneficial for the employee to be monitored in case of emergency and to have a record of what transpires during the encounter, for example a record of the conversation, witnesses or other evidence. However, there are many situations in which an employee is not in a controlled environment during the course of their duties, is required to carry out their duties in a public environment or to go out to a member of the public's place of residence or place of business.

It can be beneficial in such circumstances for employees to have a portable method of capturing video of an incident or conversation that can be used on the move and which allows video to be streamed to a monitoring station and which can be recorded. Body mountable camera devices can be used to fulfil this need. However it can be difficult for security personnel to monitor video recorded by a high number of users by way of conventional equipment. Furthermore, known IP-based CCTV systems, such as those which conform to the ONVIF standard (www.onvif.org) face a problem in that each camera requires a unique IP address and IP addresses are limited in some networks.

Improved ways of monitoring high numbers of people who may potentially be at risk are therefore required. In addition, improved ways of monitoring video data from a high number of video capturing devices are also required.

SUMMARY OF THE INVENTION

A first aspect of the invention provides a method of monitoring video from a plurality of body mounted (typically human body mounted) video capturing (typically video streaming) devices, the method comprising: receiving (e.g. over a network connection, typically comprising a wireless network portion such as a Wi-Fi or cellular wireless network portion) video data from a first body mounted video capturing device of the said plurality; propagating video data received from the said first body mounted video capturing device, or video data derived therefrom, to a closed circuit television (CCTV) monitoring system by way of an input channel thereof; subsequently receiving (e.g. over a network connection, typically comprising a wireless network portion such as a Wi-Fi or cellular wireless network portion) video data from a second body mounted video capturing device of the said plurality different from the said first body mounted video capturing device; and propagating video data received from the said second body mounted video capturing device, or video data derived therefrom, to the said CCTV monitoring system by way of the same said input channel thereof.

By propagating video data received from different body mounted video capturing devices of the said plurality, or video data derived therefrom, to the same input channels of the CCTV monitoring system, the same input channels are re-used to receive video data from different body mounted video capturing devices over time. This allows video captured by a relatively larger number of body mounted video capturing devices to be monitored using a relatively smaller number of input channels of the CCTV monitoring system. This is particularly useful in situations where it is necessary to monitor video from a high number (e.g. greater than 100, or greater than 1000) of body mounted video capturing devices which transmit captured video irregularly.

Typically the method comprises ceasing to receive video data from the first body mounted video capturing device after the step of receiving video data from the first body mounted video capturing device but before the step of subsequently receiving video data from the second body mounted video capturing device.

Typically the said video data received from each of the said first and second body mounted video capturing devices is video data captured by that said body mounted video capturing device, or video data derived therefrom.

Typically the steps of receiving and propagating video data are performed by a video server computer comprising one or more computer processors.

The closed circuit television (CCTV) monitoring system and video server computer may each be ONVIF compliant, for example at least compliant with ONVIF profile S and G.

It may be that the method further comprises receiving audio data captured by the first and/or second body mounted video capturing devices or audio data derived therefrom. It may be that the propagated data comprises said received audio data or audio data derived therefrom.

It may be that the method further comprises receiving video data from each of the first and second body mounted video capturing devices irregularly. It may be that each of the body mounted video capturing devices of the said plurality transmits video data captured thereby or video data derived therefrom irregularly. For example, it may be that the body mounted video capturing devices of the said plurality are configured to capture and transmit video data responsive to a user command (e.g. pressing a button, issuing a voice command). Additionally or alternatively, it may be that the body mounted video capturing devices of the said plurality are configured to automatically capture and transmit video data responsive to an external trigger, such as a video or audio recognition event (e.g. a video or audio event recognised by an event recognition algorithm performed (e.g. by the body mounted video capturing devices or by a server in data communication with the body mounted video capturing devices configured to receive video and/or audio data from the body mounted video capturing devices) on video and/or audio data captured by the body mounted video capturing device). It may be that the body mounted video capturing devices of the said plurality are configured to operate in a sleep mode (typically in which no video data is captured by the respective body mounted video capturing device) in the absence of a said trigger or a said user command detected by the said body mounted video capturing device.

It may be that the method further comprises storing video data received from the said first and second body mounted video capturing devices or video data derived therefrom.

The method typically further comprises receiving identification data containing identifiers of the said first and second body mounted video capturing devices (typically together with the received video data) and associating the said identifier of the respective said body mounted video capturing device with the video data captured thereby or video data derived therefrom.

It may be that the method further comprises associating (e.g. in a database) each of the body mounted video capturing devices of the said plurality with a respective user. By associating each of the body mounted video capturing devices of the said plurality with a respective user, it can be readily determined to which user the body mounted video capturing device was mounted when particular video data was captured. This may be useful information if the video data is later used in evidence.

It may be that the method comprises time stamping associations between the body mounted video capturing devices of the said plurality and respective users. It may be that the method comprises storing associations between the said body mounted video capturing devices and respective users (typically including said time stamps, where provided). It may be that the method comprises time stamping video data captured by the said body mounted video capturing devices and/or video data derived therefrom. It may be that the method comprises time stamping received video data from the first and/or second body mounted video capturing devices. It may be that the method comprises storing time stamps associated with the received video data or video data derived therefrom. Again, the time stamps provide useful information if the video data is later used in evidence.

It may be that the method further comprises associating (e.g. in a database) a body mounted video capturing device of the said plurality with a respective first user; and subsequently associating (e.g. in the said database) the said body mounted video capturing device with a respective second user different from the respective first user. That is, it may be that one or more of the said body mounted video capturing devices are associated with different users over time (e.g. in the said database). For example, it may be that the said body mounted video capturing devices are provided as part of a pool of body mounted video capturing devices which are interchangeably body mounted to different users of a group of users over time.

It may be that the method further comprises prioritising video data received from the first and/or second body mounted video capturing devices or video data derived therefrom (typically prior to the step of propagating said data to the CCTV monitoring system for display). It may be that the method comprises propagating to the CCTV monitoring system video data received from the first and/or second body mounted video capturing devices or video data derived therefrom in a time order determined in accordance with said prioritisation.

It may be that the step of prioritising video data is performed with reference to a priorities database. For example, the said priorities database may associate one or more users or one or more body mounted video capturing devices of the said plurality with respective priority levels. In this case, it may be that the step of prioritising video data received from the first and/or second body mounted video capturing devices or video data derived therefrom comprises determining a priority level of a user of the respective body mounted video capturing device, or a priority level of the respective body mounted video capturing device, from the said priorities database, associating the said priority level with the said video data and prioritising said video data responsive to the priority level associated therewith.

It may be that the said step of prioritising said video data comprises associating video data received from the first and/or second body mounted video capturing devices, or video data derived therefrom, with priority data (e.g. metadata) for use by the CCTV monitoring system to prioritise display of the said video data on one or more monitors of the said CCTV monitoring system.

It may be that the method further comprises receiving event data associated with the respective video data from the first and/or second body mounted video capturing devices, and wherein the step of prioritising said video data is performed responsive to the said event data associated with the respective video data.

It may be that the said body mounted video capturing devices of the said plurality are configured to receive an event input (e.g. from a user thereof). For example, the said body mounted video capturing devices may comprise event input buttons for receiving respective event inputs, such as a door open button, a door closed button or a panic button. It may be that the event data transmitted (and thus received) together with the video data captured by the body mounted video capturing device (or video data derived therefrom) comprises, or is generated responsive to, the said event input.

It may be that the method comprises the CCTV monitoring system displaying the said prioritised video data on one or more monitors thereof selected responsive to the said prioritisation of the said video data (e.g. responsive to said priority data).

It may be that the method comprises propagating said video data or video data derived therefrom to the CCTV monitoring system on a priority input channel thereof (e.g. by emulating an IP address associated with the said priority input channel) responsive to said prioritisation of said video data (e.g. responsive to said priority data). It may be that the said input channel on which video data received from the first and second body mounted camera devices (or video data derived therefrom) is propagated is the said priority input channel.

It may be that the method further comprises determining the location of the first body mounted video capturing device.

It may be that the method comprises determining the location of the said first body mounted video capturing device by way of a global navigation satellite positioning system (i.e. GNSS system such as the global positioning system (GPS), Galileo, GLONASS and so on), but more typically the method comprises determining the location of the first body mounted video capturing device by processing signal source data relating to electromagnetic signals received by the first body mounted video capturing device from one or more (typically terrestrial) electromagnetic signal sources (e.g. Wi-Fi access points, Bluetooth beacons and so on). For example, the location of the first body mounted video capturing device may be determined from: identifiers (e.g. media access control (MAC) addresses) of one or more electromagnetic signal sources detected by the first body mounted video capturing device (e.g. which may be derived from electromagnetic signals received from the said electromagnetic signal sources by the first body mounted video capturing device and compared to a database of electromagnetic signal sources of known location to determine the locations of the electromagnetic signal sources); and strengths of electromagnetic signals received (and measured) by the first body mounted video capturing device from the said one or more electromagnetic signal sources. For example, the received signal strengths may be processed to determine respective distances of the first body mounted video capturing device from the electromagnetic signal sources, the distances then being used in a triangulation algorithm to estimate the location of the first body mounted video capturing device (e.g. if the signal sources are of known location). Received signal strengths and identifiers may alternatively be compared to electromagnetic fingerprint data to estimate the location of the first body mounted video capturing device. Alternatively, time of flight measurements of electromagnetic signals between the first body mounted video capturing device and one or more electromagnetic signal sources may be made, the times of flight of electromagnetic signals between signal sources and the first body mounted video capturing device being indicative of respective distances between the first body mounted video capturing device and the electromagnetic signal sources, the distances then being used in a triangulation algorithm together with known locations of the electromagnetic signal sources identified by the identifiers to thereby estimate the location of the first body mounted video capturing device. Alternatively, any other suitable alternative method of estimating location of the first body mounted video capturing device may be used.

It may be that the method further comprises comprising initiating video capture or prioritising video data from one or more selected video capturing devices, wherein the said selected video capturing devices are located in a locality of the first body mounted video capturing device. The step of prioritising video data may comprise any of the applicable video data prioritisation steps discussed herein.

It may be that the step of initiating video capture or prioritising video data from one or more selected video capturing devices is performed responsive to determination of the said location of the first body mounted video capturing device.

The said locality of the said first body mounted video capturing device may for example each comprise or consist of a geographical region of predefined radius comprising the determined location of the first body mounted video capturing device The method may comprise maintaining a database of locations of video capturing devices. The said database may comprise locations of one or more fixed position video capturing devices (e.g. fixed position CCTV cameras). The said database may comprise locations of one or more body mounted video capturing devices (e.g. including one or more body mounted video capturing devices of the said plurality of body mounted video capturing devices). The database may comprise locations of the said plurality of body mounted video capturing devices.

It may be that the step of initiating video capture or prioritising video data from said one or more selected video capturing devices comprises: selecting from the database one or more video capturing devices having locations in the said locality of the first body mounted video capturing device; and initiating video capture or prioritising video data from the selected video capturing devices.

It may be that the method comprises receiving from the first body mounted video capturing device beacon data relating to one or more (typically terrestrial) electromagnetic (e.g. Bluetooth) signal beacons detected by the said first body mounted video capturing device, each of the detected beacons being associated with (typically provided in or on) one or more respective video capturing devices in the locality of the first body mounted video capturing device. Typically the said beacon data comprises identification data identifying the video capturing devices associated with the said detected beacons. Alternatively the method may comprise identifying video capturing devices associated with the said detected beacons by comparing identifiers of the detected beacons with data associating the identifiers of the detected beacons with respective video capturing devices. Typically the identifiers of the detected beacons are contained in and extracted from electromagnetic signals from the respective beacons detected by the first body mounted video capturing device and provided (by the first body mounted video capturing device) in the said beacon data.

It may be that the step of initiating video capture or prioritising video data from said one or more selected video capturing devices comprises: identifying from the said beacon data the video capturing devices associated with the said detected beacons (optionally including comparing identifiers of the beacons contained in the beacon data with said data associating the identifiers of detected beacons with respective video capturing devices); and initiating video capture or prioritising video data from one or more video capturing devices associated with the detected beacons.

It may be that the locality of the first body mounted video capturing device is defined by the detectable ranges of electromagnetic signals from the said beacons by the said first body mounted video capturing device.

It may be that the method further comprises receiving video data captured by the said selected video capturing devices or video data derived therefrom.

It may be that one or more of the said selected video capturing devices are fixed position video capturing devices (e.g. fixed position CCTV cameras).

It may be that one or more of the said selected video capturing devices are body mounted video capturing devices (typically of the said plurality).

It may be that the said plurality of body mounted video capturing devices are controlled and/or owned by a first party.

It may be that one or more of the said selected video capturing devices are cameras controlled and/or owned by a second party different from the first party.

It may be that the method further comprises: scheduling transmission of messages from the body mounted video capturing devices of the said plurality.

It may be that the method further comprises: determining that a scheduled message was not received from a body mounted video capturing device of the said plurality of body mounted video capturing devices; and sending a message responsive to the said determination that the scheduled message was not received to thereby indicate that the battery of the body mounted video capturing device needs charged.

Typically the said message is sent to a user and/or a system administrator. Typically the said user is associated with the said body mounted video capturing device (e.g. in a said database which associates users with respective body mounted video capturing devices).

It may be that the CCTV monitoring system monitors incoming video data from a limited number of Internet Protocol (IP) addresses. It may be that each of the said IP addresses corresponds to an input channel of the CCTV monitoring system.

It may be that the step of propagating the said video data received from the first body mounted video capturing device or video data derived therefrom to the CCTV monitoring system by way of the said input channel comprises emulating an Internet Protocol (IP) address associated with the said input channel of the CCTV monitoring system and the step of propagating the said video data received from the second body mounted video capturing device or video data derived therefrom to the CCTV monitoring system by way of the said input channel comprises emulating the same said IP address. Thus, video data from different body mounted video capturing devices may be presented to the same input channel at different times. This can reduce the number of IP addresses which are required. This can reduce licensing costs where these are dependent on the number of IP addresses which are monitored.

A second aspect of the invention provides a video server comprising one or more computer processors, the video server being configured to perform a method of monitoring video from a plurality of body mounted (typically human body mounted) video capturing (typically video streaming) devices, the method comprising: receiving (e.g. over a network connection, typically comprising a wireless network portion such as a Wi-Fi or cellular wireless network portion) video data from a first body mounted video capturing device of the said plurality; propagating video data received from the said first body mounted video capturing device, or video data derived therefrom, to a closed circuit television (CCTV) monitoring system by way of an input channel thereof; subsequently receiving (e.g. over a network connection, typically comprising a wireless network portion such as a Wi-Fi or cellular wireless network portion) video data from a second body mounted video capturing device of the said plurality different from the said first body mounted video capturing device; and propagating video data received from the said second body mounted video capturing device, or video data derived therefrom, to the said CCTV monitoring system by way of the same said input channel thereof.

A third aspect of the invention provides a video monitoring system comprising: a plurality of body mounted (typically human body mounted) video capturing (typically video streaming) devices, a closed circuit television (CCTV) monitoring system comprising one or more monitors for displaying video data thereon, and a video server, the video server being configured to perform a method comprising: receiving (e.g. over a network connection, typically comprising a wireless network portion such as a Wi-Fi or cellular wireless network portion) video data from a first body mounted video capturing device of the said plurality; propagating video data received from the said first body mounted video capturing device, or video data derived therefrom, to the CCTV monitoring system by way of an input channel thereof; subsequently receiving (e.g. over a network connection, typically comprising a wireless network portion such as a Wi-Fi or cellular wireless network portion) video data from a second body mounted video capturing device of the said plurality different from the said first body mounted video capturing device; and propagating video data received from the said second body mounted video capturing device, or video data derived therefrom, to the said CCTV monitoring system by way of the same said input channel thereof.

Typically the CCTV monitoring system is configured to display received video data from the said video server on one or more monitors thereof.

A fourth aspect of the invention provides a method of monitoring video from a plurality of video capturing (typically video streaming) devices, the method comprising: receiving (e.g. over a network connection, typically comprising a wireless network portion such as a Wi-Fi or cellular wireless network portion) data including video data from a body mounted video capturing device; and, responsive to the received data, initiating video capture or prioritising video data from one or more selected video capturing devices located in the locality of the body mounted video capturing device.

It may be that the said received data comprises beacon data relating to one or more electromagnetic (e.g. Bluetooth) beacons detected by the said body mounted video capturing device, each of the detected beacons being associated with (typically provided in or on) one or more respective video capturing devices in the locality of the respective body mounted video capturing device.

Typically the said beacon data comprises identification data identifying video capturing devices associated with the said detected beacons. Alternatively the method may comprise identifying video capturing devices associated with the said detected beacons by comparing identifiers of the detected beacons with data associating the identifiers of the detected beacons with respective video capturing devices. Typically the identifiers of the detected beacons are contained in electromagnetic signals from the respective beacons detected by the said body mounted video capturing device and provided (by the body mounted video capturing device) in the said beacon data.

It may be that the step of initiating video capture or prioritising video data from said one or more selected video capturing devices comprises: identifying from the said beacon data the video capturing devices associated with the said detected beacons (optionally including comparing identifiers of the beacons contained in the beacon data with said data associating the identifiers of detected beacons with respective video capturing devices); and initiating video capture or prioritising video data from one or more video capturing devices associated with the detected beacons.

It may be that the locality is defined by the detectable ranges of electromagnetic signals from said beacons by the said body mounted video capturing device.

It may be that the method comprises determining the location of the body mounted video capturing device. For example, it may be that the received data comprises location data from which the location of the body mounted video capturing device can be determined (e.g. GNSS data or electromagnetic signal source data relating to one or more electromagnetic signal sources detected by the body mounted video capturing device). It may be that the step of initiating video capture or prioritising video data from said one or more selected video capturing devices is performed responsive to the determination of the said location of the said body mounted video capturing device.

The said locality of the said body mounted video capturing device may for example comprise or consist of a geographical region of predefined radius comprising the determined location of the body mounted video capturing device, or an indoor region (e.g. a building) comprising the determined location of the body mounted video capturing device.

The method may comprise maintaining a database comprising locations of video capturing devices. The said database may comprise locations of one or more fixed position video capturing devices (e.g. fixed position CCTV cameras). The said database may comprise locations of one or more body mounted video capturing devices. The database may comprise locations of the said plurality of video capturing devices.

It may be that the step of initiating video capture or prioritising video data from said one or more selected video capturing devices comprises: selecting from the database one or more video capturing devices having locations in the said locality of the said body mounted video capturing device; and initiating video capture or prioritising video data from the selected video capturing devices.

It may be that the method further comprises receiving video data captured by the said selected video capturing devices or video data derived therefrom.

It may be that one or more of the said selected video capturing devices are fixed position video capturing devices (e.g. fixed position CCTV cameras).

It may be that the said plurality of body mounted video capturing devices are controlled and/or owned by a first party.

It may be that one or more of the said selected video capturing devices are cameras controlled and/or owned by a second party different from the first party.

It may be that one or more of the said selected video capturing devices are body mounted video capturing devices.

It may be that the said step of prioritising video data from one or more selected video capture devices comprises associating video data received from the said selected video capturing devices, or video data derived therefrom, with priority data (e.g. metadata) for use by the CCTV monitoring system to prioritise display of the said video data on one or more monitors of the said CCTV monitoring system.

It may be that the method comprises the CCTV monitoring system displaying the said prioritised video data on one or more monitors thereof selected responsive to the said prioritisation of the said video data (e.g. responsive to said priority data).

It may be that the method comprises propagating said video data or video data derived therefrom to the CCTV monitoring system on a priority input channel thereof (e.g. by emulating an IP address associated with the said priority input channel) responsive to said prioritisation of said video data (e.g. responsive to said priority data).

A fifth aspect of the invention provides a video server comprising one or more computer processors, the video server being configured to perform a method of monitoring video from a plurality of video capturing (typically video streaming) devices, the method comprising: receiving (e.g. over a network connection, typically comprising a wireless network portion such as a Wi-Fi or cellular wireless network portion) data including video data from a body mounted video capturing device; and, responsive to the received data, initiating video capture or prioritising video data from one or more selected video capturing devices located in the locality of the body mounted video capturing device.

A sixth aspect of the invention provides a method of monitoring a battery charge status of a body mountable video capturing device, the method comprising: scheduling transmission of messages from the body mounted video capturing device; determining that a scheduled message was not received from the body mounted video capturing device; and sending a message responsive to the said determination that the scheduled message was not received to thereby indicate that the battery of the body mounted video capturing device needs charged.

A seventh aspect of the invention provides a video server comprising one or more computer processors, the video server being configured to perform a method of monitoring a battery charge status of a body mountable video capturing device, the method comprising: scheduling transmission of messages from the body mounted video capturing device; determining that a scheduled message was not received from the body mounted video capturing device; and sending a message responsive to the said determination that the scheduled message was not received to thereby indicate that the battery of the body mounted video capturing device needs charged.

The invention also extends to computer program code (and a non-transitory computer readable medium storing such computer program code) for performing the methods of any of the first, fourth or sixth aspects of the invention.

The invention also extends to computer program code (and a non-transitory computer readable medium storing such computer program code) for causing a computing device to function as the video servers of any of the second, fifth or seventh aspects of the inventions.

Although various aspects and embodiments of the present invention have been described separately above, any of the aspects and features of the present invention can be used in conjunction with any other aspect, embodiment or feature where appropriate. For example apparatus features may where appropriate be interchanged with method features.

DESCRIPTION OF THE DRAWINGS

An example embodiment of the present invention will now be illustrated with reference to the following Figures in which:

FIGS. 7 and 8 illustrate data stored in a database which associates users with body mountable camera devices, said associations being time stamped;

DETAILED DESCRIPTION OF AN EXAMPLE EMBODIMENT

Figure 1:
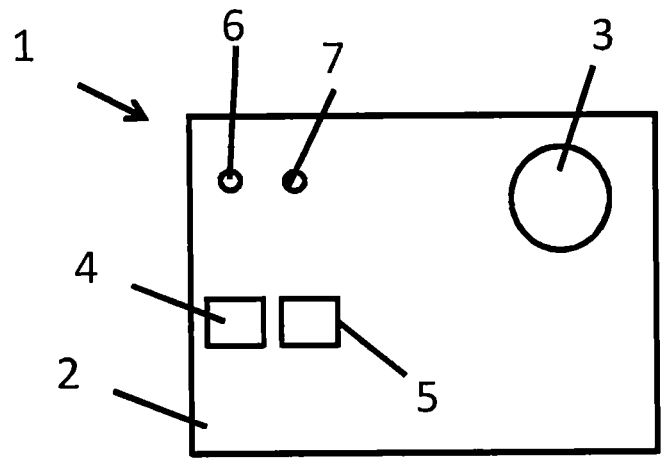
FIG. 1 is a block diagram of a body mountable camera device for capturing video.
Figure 2:
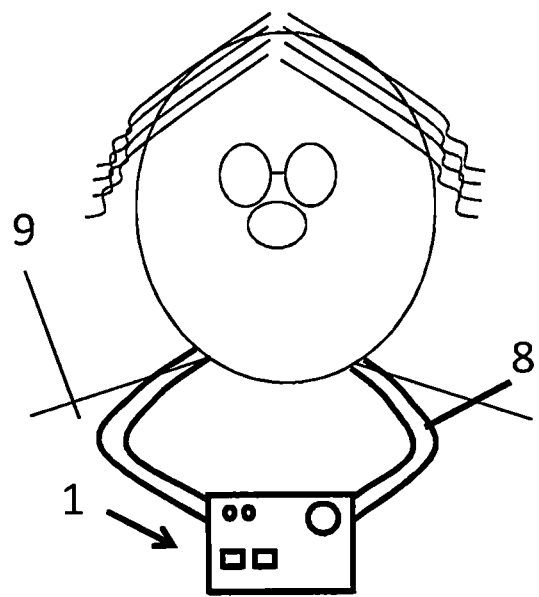
FIG. 2 illustrates the body mountable camera device of FIG. 1 mounted to a human body by way of a lanyard worn around their neck.

FIG. 1 shows a front face of a body mountable video capturing camera device 1 having a device body 2 carrying: a digital camera 3; a controller 4 (which typically comprises a computer processor and typically a memory storing computer program instructions executable by the computer processor) in electronic communication with the digital camera 3 (such that the controller 4 can receive video data captured by the digital camera 3 and that the controller 4 can control whether the digital camera 3 is capturing video or not); a wireless telecommunications antenna 5 (such as a Wi-Fi antenna or a cellular communications antenna or both) in electronic communication with the controller 4; a video capture button 6 in data communication with the controller 4, the button being switchable between first and second positions which cause the controller 4 to initiate and stop video capture by the digital camera 3 respectively; and a panic button 7 which can be pressed to provide an indication that the video being captured by the digital camera 3 should be monitored with high priority. The body mountable video capturing camera device 1 is mountable to a body by way of a clip (typically provided on a back side of the body mountable video capturing device, not shown) and/or by a lanyard 8 worn around the neck of a user 9 and carrying the body mountable camera device 1 as shown in FIG. 2. The camera device 1 is powered by a rechargeable battery (not shown) carried by the housing.

Figure 3:
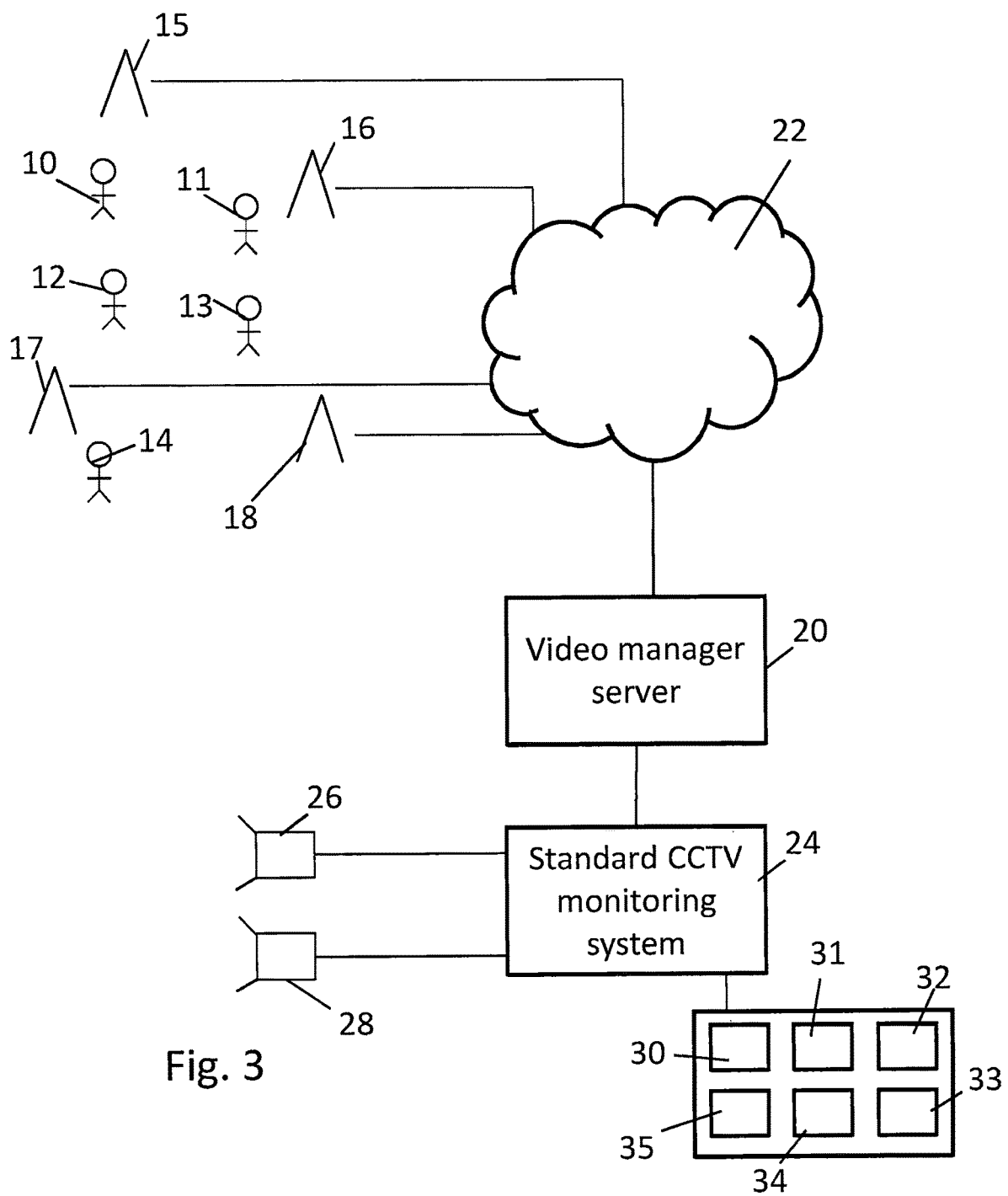
FIG. 3 is a block diagram of a system for monitoring video from a plurality of body mounted camera devices of the type shown in FIGS. 1 and 2.

FIG. 3 shows a system for monitoring video from a plurality of body mounted camera devices 1 of the type shown in FIGS. 1 and 2. A respective body mountable camera device of the type shown in FIGS. 1 and 2 is mounted to each of five users 10-14. Four wireless access points 15-18, which are capable of communicating with the body mounted camera devices 1 by way of the wireless telecommunications antennas 5 of the body mounted camera devices 1 when they are within range of the respective wireless access points 15-18, are provided in the geographical area occupied by the users 10-14 as a whole.

The wireless access points 15-18 are in data communication with a video manager server 20 by way of a network 22 such as the internet or a local area network (LAN). The video manager server 20 comprises one or more processors and a memory storing computer program instructions executable by the said processors to thereby cause the server 20 to receive (typically in real time) video data by way of the network 22 from the body mounted camera devices 1 mounted to each of the five users 10-14 and to propagate video data received by the video manager server 20 (or video data derived therefrom, such as compressed video data derived therefrom) to an IP-based closed circuit television (CCTV) monitoring system 24 which complies with the ONVIF standard (www.onvif.org). The server 20 and monitoring system 24 may be in the same or different locations and on the same LAN, or WAN, or simply communicate over the internet. Multiple servers 20 in different locations may communicate with the same monitoring system 24, which might be a CCTV video monitoring station. The CCTV monitoring system 24 has a limited number of input channels, each of which is defined by a respective IP address. Some of the input channels are allocated to fixed location CCTV cameras 26, 28 (which may always be on) which continuously transmit video to the CCTV monitoring system 24. The video manager server 20 has exclusive access to a subset of the input channels of the CCTV monitoring system 24 and is configured to propagate video data received from the body mounted camera devices 1, or video data derived therefrom (e.g. compressed video data derived from the video data received from the cameras 1), to the CCTV monitoring system 24 by way of the input channels of the said subset by emulating the IP addresses associated with the input channels of the said subset. The server 20 thereby presents a group of a fixed number of IP addresses (which is usually small, e.g. 16 or fewer, or 8 or fewer) to the CCTV monitoring system 24, with one video feed per IP address. As only a subset of the video capturing camera devices 1 are transmitting data which is to be passed to the CCTV monitoring system, a limited number of IP addresses may be used to transmit, in parallel, video data which may come from any of a large number of body mounted camera devices 1. The server 20 may act as a multi input camera encoder according to the ONVIF standard, If a plurality of servers 20 provide video to the same CCTV monitoring system 24 they will each present a different group of a fixed number of IP addresses to the CCTV monitoring system 24. The CCTV monitoring system 24 comprises six display monitors 30-35 for displaying to security personnel video based on video data received from the body mounted camera devices 1 via the video server 20 and from the fixed position CCTV cameras 26, 28. Communication between the video manager server 20 and the CCTV monitoring system 24 uses the ONVIF protocol. Accordingly, the video manager server 20 and CCTV monitoring system 24 are typically ONVIF compliant (typically at least profile S and G compliant).

In the present example, the users 10-14 are employees required to carry out their duties in a public environment, such as in a supermarket or shopping mall. They are required to capture video by way of their body mounted camera devices 1 irregularly and typically rarely, for example in the event of a hostile encounter with a member of the public. Typically, if a user 10-14 foresees such an encounter, or after such an encounter has begun, they will initiate video capture by the digital camera 3 by pressing the button 6 on the device 1, thereby toggling the button 6 from the position in which no video data is captured by the digital camera 3 to the position in which video data is captured by the digital camera 3. Video data captured by the digital camera is then transmitted from the device 1 to the video server 20 in real time by way of the wireless telecommunications antenna 5, one of the base stations 15-18 and the network 22.

A plurality of devices 1 are provided in a pool of devices 1 which are interchangeably used by the different users 10-14. The devices 1 may thus each be worn by a different user 10-14 on any given day. In this case, the users 10-14 are required to check out and check in a device 1, and this information is logged in a database 38 stored on the server 20. As shown in FIGS. 7 and 8, the database 38 associates identifiers (e.g. names or employee numbers) of users 10-14 with identifiers (e.g. serial numbers) of the devices 1 they have checked out together with time stamps indicating the check out and check in time of the device 1. The time stamps indicate when each particular device 1 was associated with a particular user 10-14. As can be seen by comparing FIGS. 7 and 8, the devices 1 may be allocated to different users 10-14 on different days. Historical user/device association data and associated time stamp data is stored in memory so that it can be determined which user 10-14 was using which device at any given time. This is useful for determining which user 10-14 captured particular video data. The database 38 may also store details of a system administrator responsible for maintenance of the body mounted camera devices 1 with which they are associated in the database (e.g. to ensure that their batteries are charged).

The number of input channels in the subset of input channels of the CCTV monitoring system 24 to which the video manager server 20 has exclusive access is typically fewer than the number of body mounted camera devices 1 (of which there are five in this example) which need to be monitored. However, as the body mounted camera devices 1 capture and transmit video data irregularly and rarely, typically only the body mounted camera devices 1 mounted to a subset of the users 10-14 transmit video data to the server 20 at any given time, the subset comprising one or more users 10-14 and being fewer than the total number of users 10-14. Therefore, video from only a subset of the camera devices 1 mounted to users 10-14 needs to be monitored on the displays 30-35 at any given time.

Figure 4:
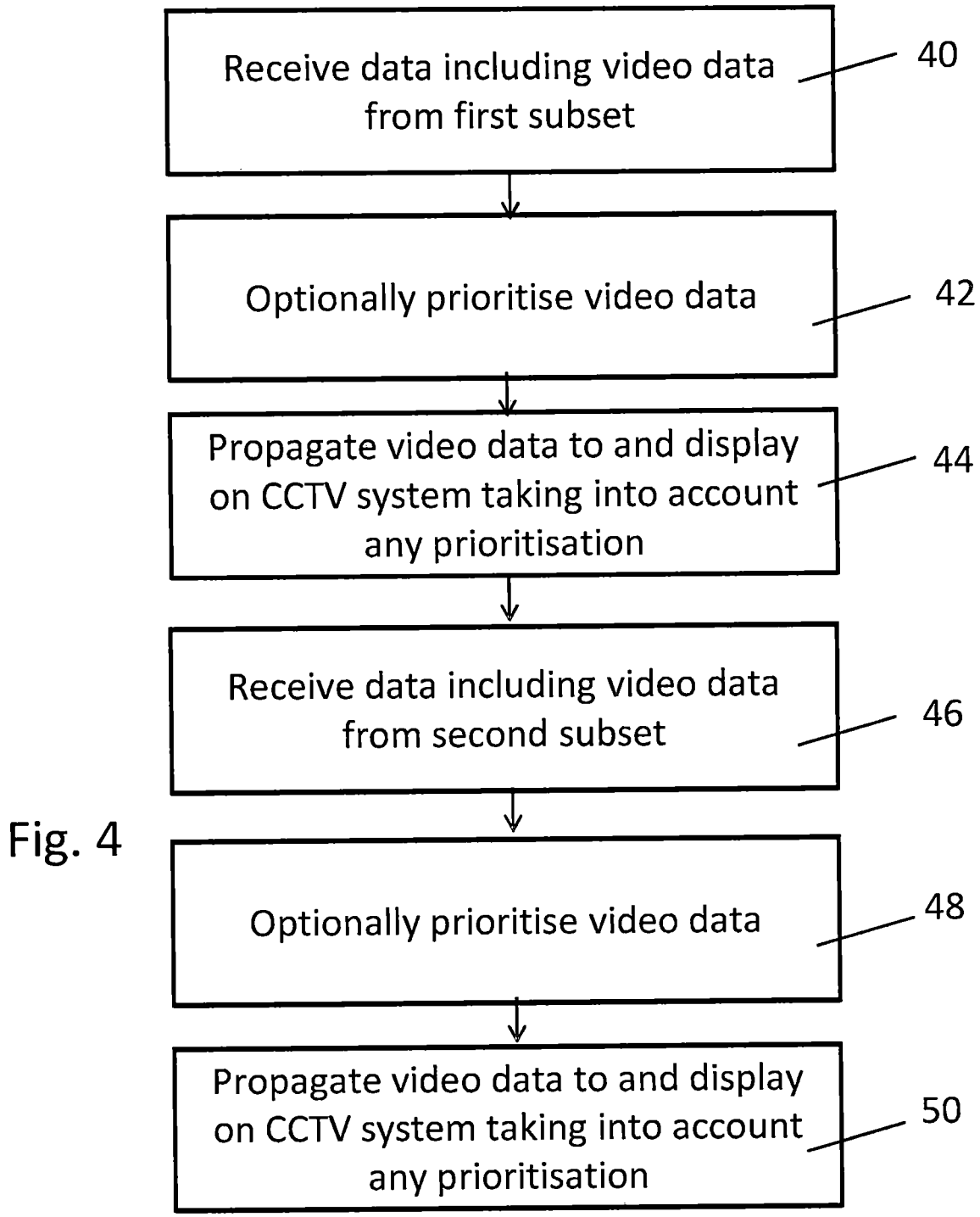
FIG. 4 is a flow chart illustrating a method of monitoring video from a plurality of body mounted camera devices.

FIG. 4 illustrates a method of monitoring video captured by the devices 1 mounted to the users 10-14. In a first step 40, the video server 20 receives video data from a first subset of the devices 1 mounted to the users 10-14. The first subset of devices 1 typically comprises one or more devices 1 and typically comprises fewer than the total number of devices 1 of the system (of which there are five in this example). In this example, it will be assumed that the first subset of devices 1 comprises a single device 1, which will be referred to below as the first body mounted video capturing device.

In an optional next step 42, the processor of the server 20 executes computer program instructions causing it to prioritise video data which it receives. This may be done, for example, if video data is received from a larger number of camera devices 1 than there are input channels of the CCTV monitoring system to which the server 20 has exclusive access. In that case, higher priority received video is transmitted to the CCTV monitoring system 24 prior to lower priority received video. Prioritisation of video data may additionally or alternatively be performed in order to display particular video on particular ones of the monitoring screens 30-35 of the CCTV monitoring system 24 (e.g. higher priority video may be displayed on more prominent central screens 31, 34 or on more than one screen 30-35).

Figure 9:
FIG. 9 illustrates data stored in a database which associates users of body mountable camera devices with priority levels.

Different priority levels may be allocated to different users depending on anticipated risk levels of their particular roles within an organisation. Accordingly, as shown in FIG. 9, a priorities database 52 may be stored on a memory of the server 20 which associates users with priority levels. Prioritisation of received video data may thus comprise determining from the database 38 which of the users 10-14 is associated with the device 1 from which video data was received and determining from the priorities database 52 (see FIG. 9) whether the user 10-14 has a low, medium or high priority. Additionally or alternatively, event data may be transmitted by the respective body mounted camera device 1 together with the video data which is indicative of a priority level. For example, if the panic button 7 is pressed by the user 10-14 on the device 1 which captured the video data, panic event data may be transmitted by the respective body mounted camera device 1 together with the video data captured thereby to indicate that the video data should be monitored at high priority. As discussed above, the priority level associated with the video data can then be used to either determine the time order in which video data should be sent to the CCTV monitoring system by way of the input channels of the subset reserved for the video manager server 20, or priority data can be transmitted together with the video data to the CCTV system so that the CCTV system can thereby determine on which monitor screen 30-35 to display the video (e.g. the CCTV system 24 may be configured to show video based on video data of higher priority on a more central screen 31 or 34 rather than a more peripheral screen 30, 32, 33, 35).

Additionally or alternatively, priority data can be used by the server 20 to determine an input channel of the CCTV monitoring system 24 on which to transmit video data associated therewith. For example, the server 20 may have access to a priority channel of the CCTV monitoring system 24, and the server 20 may be configured to propagate video data associated with a higher priority level to the CCTV monitoring system 24 on the said priority channel. The CCTV monitoring system 24 may then display the said video on a more prominent screen (or on more than one screen). The CCTV monitoring system 24 may change the display screen 30-35 on which another video stream from a different camera (e.g. another body mounted camera device 1 or a fixed position CCTV camera 26, 28) is displayed in order to allow it to display video associated with a higher priority level on a particular display screen.

The priority data may comprise metadata which the server 20 interprets as priority data. Priority data may be data which indicates to the server 20 that particular video data with which it is associated is priority video data or non-priority video data. Alternatively, priority data may provide finer distinctions such as low, medium and high priority as illustrated in FIG. 9.

Thus, in a next step 44, video data received from the first body mounted video capturing device (or video data derived therefrom, e.g. compressed video data derived therefrom) is propagated from the video manager server 20 to the CCTV monitoring system 24 by way of an input channel of the CCTV monitoring system 24 reserved for exclusive use by the video server 20, the video server 20 emulating the IP address associated with that input channel. Where provided, priority data is also transmitted to the CCTV system 24 from the server 20 together with the video data. The CCTV monitoring system 24 then displays video based on the received video data, taking into account any received priority data when determining on which screen 30-35 to display the video.

In a next step 46, typically performed after the server 20 ceases to receive video data from the first body mounted camera device (typically because the user associated with that device has toggled the button 6 to cease video capture and video data transmission from the first body mounted camera device), video data is received from a second subset of the devices 1 mounted to the users 10-14. The second subset of devices 1 typically comprises one or more devices 1 and typically comprises fewer than the total number of devices 1 of the system (of which there are five in this example). In this example, it will be assumed that the second subset comprises a single device 1 which is different from the first body mounted camera device and which will be referred to below as the second body mounted video capturing device. In a next optional step 48, the video data received from the second subset of devices 1 may be prioritised (as above). In a next step 50, video data received from the second body mounted camera device (or video data derived therefrom, e.g. compressed video data derived therefrom) is propagated from the video manager server 20 to the CCTV monitoring system 24 by way of the same input channel used in step 44 to propagate video data from the first body mounted camera device (or video data derived therefrom) to the CCTV system, the video manager server 20 again emulating the IP address associated with that channel. Where appropriate, any priority data is also transmitted to the CCTV system 24 from the server 20 together with the video data. The CCTV monitoring system then displays video based on the received video data, taking into account any received priority data when determining on which screen 30-35 to display the video.

In this way, one or more input channels of the CCTV monitoring system 24 reserved for use by the video server can re-used to monitor video data from different body mounted camera devices 1. Accordingly, fewer input channels of the CCTV monitoring system 24 are required than the total number of body mounted camera devices from which video potentially needs to be monitored. This re-use of input channels of the CCTV monitoring system 24 allows a standard CCTV monitoring system with a limited number of input channels, such as an IP-based system (e.g. an ONVIF compliant system) which receives data from a limited number of IP addresses. to be used to monitor video from a higher number of body mounted camera devices, which in turn helps to restrict the cost of monitoring video from such a high number of body mounted camera devices 1 (which might otherwise require a bespoke system with a very high number of input channels).

After the video manager server 20 has received video data from a body mounted camera device 1 mounted to a user 10-14, say the first body mounted camera device discussed above, it may initiate video capture or (for example in the case of fixed position CCTV cameras continuously capturing video) prioritise video data from selected other video capture devices in the locality of that device 1 and subsequently receive video data captured by those other video capture devices and transmitted to the video manager server 20 (typically by those video capture devices). This can provide the video manager server 20 with video data related to the video data received from the first body mounted camera device (e.g. showing the same scene from a different angle, or showing a person of interest in a different location from that in which they are present in the video data from the first body mounted camera device), which it can then propagate to the CCTV monitoring system 24 for viewing by security personnel on one or more monitor screens 30-35.

Figure 5:
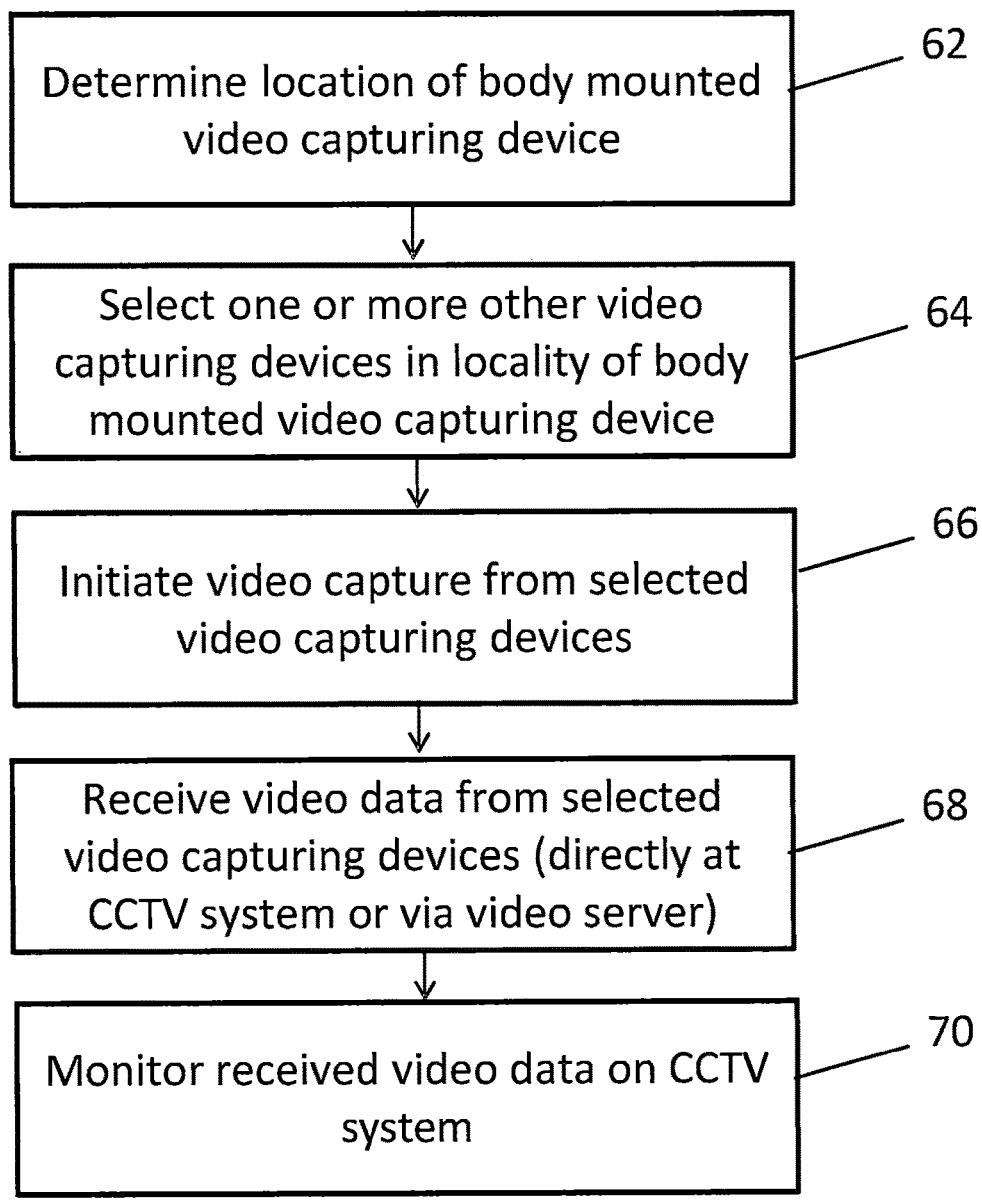
FIG. 5 is a flow chart illustrating a method of monitoring video from a plurality of camera devices.

In one example described in FIG. 5, the video manager server 20 can determine the location of the first body mounted camera device in step 62. In the present example, the first body mounted camera device receives electromagnetic signals from some or all of the wireless access points 15-18 and transmits signal source data relating to the received signals to the video manager server 20. For example, the controller 4 of the first body mounted camera device may execute computer program instructions causing it to measure the strengths of received signals from some or all of the wireless access points 15-18 and transmit data relating to the received signal strengths to the server 20. Typically, the controller 4 of the first body mounted camera device also executes computer program instructions causing it to extract identifiers of the respective some or all of the wireless access points 15-18 (e.g. Media Access Control (MAC) addresses) from the received signals and transmit said data relating to the said identifiers to the server 20. The server 20 is in data communication with a database containing the locations of the wireless access points. When the server 20 receives the data relating to the received signals from the first body mounted camera device, it translates the received signal strengths of signals received by the first body mounted camera device from the respective wireless access points into the respective distances between the respective wireless access points and the first body mounted camera device using the following relationship or similar:

$$P_r = \frac{P_t G_t G_r \lambda^2}{(4\prod d)^2}$$

where: $P_r$ is the received signal power
$P_t$ is the transmitted signal power
$G_t$ is the transmit antenna gain
$G_r$ is the receive antenna gain
$\lambda$ is the signal wavelength
d is the distance between the access point and the body mounted camera device An indication of the transmitted signal power $P_t$ of a wireless access point may be contained in the electromagnetic signal received from the wireless access point, in which case it may be transmitted to the server 20 by the first body mounted camera device 1, or it may be stored in a database accessible to the server 20. Accordingly, $G_t$ is typically fixed for any given camera or access point and $G_r$ is fixed for any receiver. Accordingly, distances from an individual wireless access point to the body mounted camera device 1 can be estimated.

The server 20 also refers to the database using the MAC addresses of the wireless access points from which signals are received to determine the locations of those wireless access points. The server 20 then uses those locations together with the received signal strengths from the respective wireless access points to determine the location of the first body mounted camera device by triangulation.

Alternative methods of determining the location of the first body mounted camera device can be used in other embodiments. For example, the server 20 may determine the times of flight of electromagnetic signals between some or all of the wireless access points 10-14 and the first body mounted video capturing device, the times of flight being indicative of respective distances between the first body mounted video capturing device and the respective wireless access points 10-14, the distances being used in a triangulation algorithm to estimate the location of the first body mounted video capturing device. Alternatively, received signal strengths from particular wireless access points 10-14 may be compared to electromagnetic fingerprint data in data communication with the controller 4 to estimate the location of the first body mounted camera device. In some other embodiments, the first body mounted camera device further comprises an antenna for receiving global navigation satellite positioning system signals (i.e. GNSS system such as the global positioning system (GPS), Galileo, GLONASS and so on) from a plurality of satellites and a satellite navigation processor configured to process signals received from the satellites to determine its location, and the server 20 determines the location of the first body mounted camera device by the first body mounted camera device transmitting its determined location to the server 20.

Figure 10:
FIG. 10 illustrates data stored in a database which stores locations of a plurality of body mountable camera devices.

In some embodiments, the video server 20 can determine the locations of the body mounted camera devices mounted to each of the users 10-14 in any of the ways discussed above or any suitable alternative way. In this case, the video manager server 20 maintains a database 60 of the locations of video capture devices (see FIG. 10). The video capture devices whose locations are contained in the database 60 comprise the body mounted camera devices 1 mounted to users 10-14 and the fixed position CCTV cameras 26, 28 which are typically all owned and/or controlled by a first party (e.g. the employer of the users 10-14). In some cases, the video capture devices whose locations are contained in the database 60 further comprise one or more body mounted camera devices and/or one or more fixed position CCTV cameras owned by and/or under the control of a second party different from the first party.

In a next step 64, the video server 20 selects from the database 60 one or more other video capturing devices in the locality of the first body mounted video capturing device and, in a further next step 66, the video server 20 remotely initiates video capture or prioritises video data from the selected video capturing devices (e.g. by sending video initiating signals detectable by antenna 5 of a selected body mounted camera device, the controller 4 of which executes computer program instructions causing it to initiate video capture from the digital camera 3 thereof responsive to said received signal). In the present example, the video server 20 selects video capture devices from the database 60 having a location within a predetermined radius (e.g. 50 metres) of the determined location of the first body mounted camera device. It may be that the selected video capture devices comprise one or more fixed position CCTV cameras 26, 28 and/or one or more body mounted camera devices (e.g. a body mounted camera device 1 mounted to a different one of the users 10-14 from the first body mounted camera device, such as the second body mounted camera device). It may be that the selected video capturing devices comprise one or more video capturing devices owned by and/or under the control of the employer of users 10-14 and/or one or more video capturing devices owned by and/or under the control of a second party different from the employer of users 10-14.

In a next step 68, video data is received from the selected video capturing devices, either by the video server 20 or directly by the CCTV monitoring system 24. In the former case, video data received from the selected video capturing devices or video data derived therefrom is propagated to the CCTV monitoring system 24. In either case, in a next step 70, video data received from the selected cameras or video data derived therefrom is displayed on one or more monitor screens 30-35 thereof for viewing by security personnel. In some cases, between steps 68 and 70, it may be that the video data received from the selected video capturing devices is prioritised as discussed above in relation to video from the first and second subsets of body mounted camera devices.

In some embodiments, the body mounted camera devices 1 mounted to the bodies of users 10-14 and/or the fixed position CCTV cameras 26, 28 comprise electromagnetic signal beacons which transmit electromagnetic signals containing identifiers of the respective camera devices or CCTV cameras. It may be that the body mounted camera devices 1 are configured to receive said electromagnetic signals when in range of the said beacons by way of their antennas 5. In this case, it may be that the controller 4 of the first body mounted camera device executes computer program instructions causing it to extract identifiers of body mounted cameras 1 or fixed position CCTV cameras 26, 28 from the received electromagnetic signals and to transmit data relating to the said identifiers to the server 20. It may be that the server 20 then remotely initiates video capture by the body mounted cameras 1 (or by one or more fixed position CCTV cameras which, for example, does not capture video continuously) or prioritises video from selected fixed position CCTV cameras 26, 28 identified in the said data received by the server 20 from the first body mounted camera device 1 (e.g. by the server 20 sending a signal to the CCTV monitoring system for the CCTV monitoring system to prioritise video data from said selected fixed position CCTV cameras 26, 28, e.g. causing the CCTV monitoring system 24 to display video from said selected fixed position CCTV cameras more prominently). This may take place in response to the detection by a processor of one or more trigger events in the video data or audio from an individual body mounted camera device. Trigger events may include for example, detection of a gunshot or explosion, images of fire, or the detection of trigger words (e.g. threatening words or words calling for help), or actions (e.g. violent or threatening gestures, the wearer or another person running, screaming or shouting etc.). Trigger events can be detected using sound (including speech) or image recognition techniques known to the person skilled in art. The detection of trigger events might be carried out by a processor in the server 20 or the controller 4 of the body mounted camera device. In this way, video data from video capture devices in the locality of the first body mounted camera device can be initiated or video data therefrom can be prioritised, the locality of the first body mounted camera device being effectively defined by the detectable range of electromagnetic signals from the respective beacons.

In some cases, the body mounted camera devices 1 further comprise microphones configured to capture audio data in parallel with the video data. It may be that the body mounted camera devices 1 transmit said captured audio data or audio data derived therefrom to the server 20 which propagates received said audio data or audio data derived therefrom to the CCTV monitoring system 24 which can be audibly output (e.g. on speakers of the relevant display monitors 30-35) to security personnel.

In some embodiments, the controller 4 of the body mounted camera devices 1 may execute computer program instructions causing it to capture video and/or audio data and to determine from the captured video and/or audio data video or audio recognition events and to initiate video and/or audio capture from the digital camera 3 or microphone (not shown) thereof responsively thereto. For example, it may be that the video camera or microphone are kept switched on and video and/or audio data is monitored by the controller for trigger events, but unless and until a trigger event takes place, the video and/or audio data is not transmitted (and in some embodiments is not stored). In this way, relevant events can be captured by the body mounted camera devices 1 even when the user 10-14 thereof does not manually initiate video capture by pressing button 6.

Figure 6:
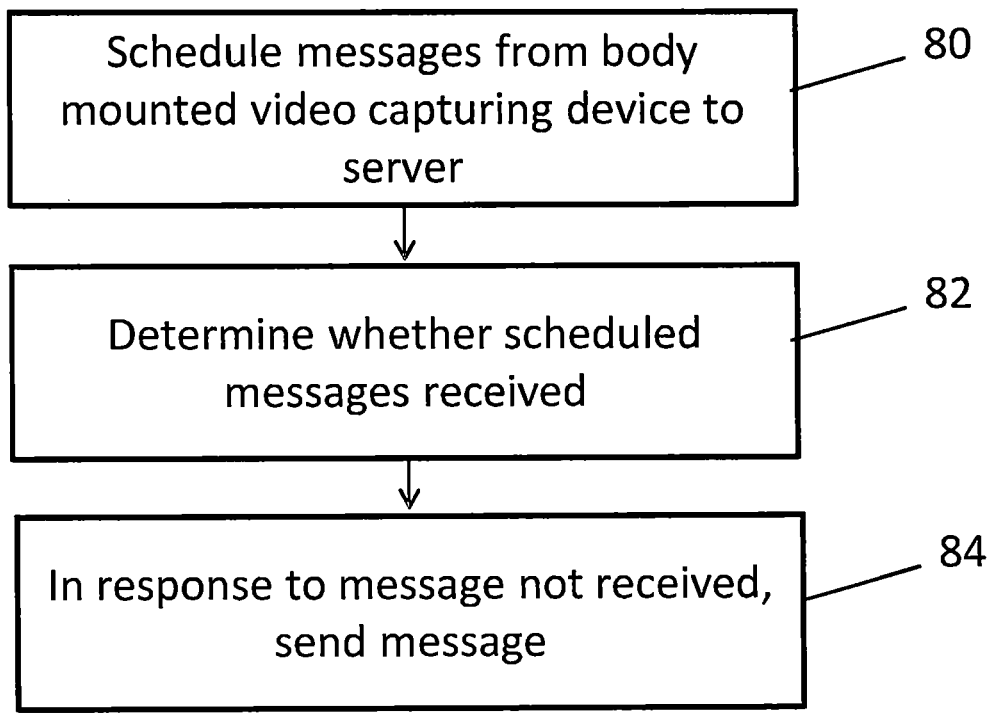
FIG. 6 is a flow chart of a method of monitoring a battery charge status of a body mountable camera device.

FIG. 6 illustrates a method of monitoring a battery charge status of the body mountable camera devices 1. In a first step 80, messages are scheduled from the body mountable camera devices 1, typically periodically. The body mountable camera devices 1 send messages in accordance with the respective schedules to the server 20 by way of their controllers 4 executing computer program instructions causing them to transmit electromagnetic signals by way of their antennas 5 to a wireless access point 15-18 which propagates the messages to the server 20 over the network 22. In a next step 82, the processor(s) of the server 20 executes computer program instructions causing it to determine whether messages have been received from the devices 1 in accordance with their respective schedules. In a next step 84, in response to a determination that a scheduled message has not been received from a body mountable camera device, the server 20 sends a message (e.g. by email or by text or instant message) either to the user or to a system administrator (or both) associated with that device (e.g. in database 38) that the battery of the body mountable device from which a scheduled message was not received needs to be charged. This provides a power efficient method of monitoring the battery charge status of the devices 1 as two-way communication between the server 20 and the devices 1 is not required in order to determine the battery charge status of the devices 1. In addition, because messages can be sent to a system administrator as well as or instead of the respective user 10-14 of the device 1, it can be better ensured that the battery of each device 1 is charged when it is needed. The message may comprise battery charge status information and a message that the battery of an individual device 1 requires to be charged can be generated responsive thereto.

Although in the above example only five users 10-14 are illustrated, typically far higher numbers of users are provided (e.g. more than 50, more than 100 or even more than 1000) to each of which is mounted a respective body mounted camera device 1 as described above. In addition, although only four wireless access points 15-18 are illustrated, typically more than four wireless access points are available to the users of the system over the geographical region occupied thereby.

Further variations and modifications may be made within the scope of the invention herein described.

The invention claimed is:
1. A method of monitoring video from a plurality of body mounted video capturing devices, the method comprising:
    receiving video data from a first body mounted video capturing device of the said plurality;

propagating video data received from the said first body mounted video capturing device, or video data derived therefrom, to a closed circuit television (CCTV) monitoring system by way of an input channel thereof;

subsequently receiving video data from a second body mounted video capturing device of the said plurality different from the said first body mounted video capturing device;

prioritising video data received from at least one of the first and second body mounted video capturing devices or video data derived therefrom; and propagating video data received from the said second body mounted video capturing device, or video data derived therefrom, to the said CCTV monitoring system by way of the same said input channel thereof, wherein the method comprises the CCTV monitoring system displaying the said prioritised video data on one or more monitors thereof selected responsive to the said prioritisation of the said video data.

2. The method of claim 1 further comprising receiving video data from each of the first and second body mounted video capturing devices irregularly.

3. The method of claim 1 further comprising storing video data received from the said first and second body mounted video capturing devices or video data derived therefrom.

4. The method of claim 1 comprising associating each of the body mounted video capturing devices of the said plurality with a respective user.

5. The method of claim 4 further comprising associating a body mounted video capturing device of the said plurality with a respective first user; and subsequently associating the said body mounted video capturing device with a respective second user different from the respective first user.

6. The method of claim 1 wherein the method comprises propagating said video data or video data derived therefrom to the CCTV monitoring system on a priority input channel thereof responsive to said prioritisation of said video data.

7. A video server comprising one or more computer processors, the video server being configured to perform a method of monitoring video from a plurality of body mounted video capturing devices, the method comprising:

receiving video data from a first body mounted video capturing device of the said plurality;

propagating video data received from the said first body mounted video capturing device, or video data derived therefrom, to a closed circuit television (CCTV) monitoring system by way of an input channel thereof;

subsequently receiving video data from a second body mounted video capturing device of the said plurality different from the said first body mounted video capturing device;

prioritising video data received from at least one of the first and second body mounted video capturing devices or video data derived therefrom; and propagating video data received from the said second body mounted video capturing device, or video data derived therefrom, to the said CCTV monitoring system by way of the same said input channel thereof, wherein the method comprises the CCTV monitoring system displaying the said prioritised video data on one or more monitors thereof selected responsive to the said prioritisation of the said video data.

8. A video monitoring system comprising:

a plurality of body mounted video capturing devices, a closed circuit television (CCTV) monitoring system comprising one or more monitors for displaying video data thereon, and a video server, the video server being configured to perform a method comprising:

receiving video data from a first body mounted video capturing device of the said plurality;

propagating video data received from the said first body mounted video capturing device, or video data derived therefrom, to the CCTV monitoring system by way of an input channel thereof;

subsequently receiving video data from a second body mounted video capturing device of the said plurality different from the said first body mounted video capturing device;

prioritising video data received from at least one of the first and second body mounted video capturing devices or video data derived therefrom; and propagating video data received from the said second body mounted video capturing device, or video data derived therefrom, to the said CCTV monitoring system by way of the same said input channel thereof, wherein the method comprises the CCTV monitoring system displaying the said prioritised video data on one or more monitors thereof selected responsive to the said prioritisation of the said video data.

* * * * *